(12) United States Patent
Melvin (10) Patent No.: US 8,732,482 B1
(45) Date of Patent: *May 20, 2014

(54) INCREMENTAL ENCRYPTION OF STORED INFORMATION

(71) Applicant: Stephen W. Melvin, Vancouver (CA)

(72) Inventor: Stephen W. Melvin, Vancouver (CA)

( * ) Notice: Subject to any disclaimer, the term of this patent is extended or adjusted under 35 U.S.C. 154(b) by 92 days.

This patent is subject to a terminal disclaimer.

(21) Appl. No.: 13/625,751

(22) Filed: Sep. 24, 2012

Related U.S. Application Data

(63) Continuation of application No. 12/758,499, filed on Apr. 12, 2010, now Pat. No. 8,275,996.

(51) Int. Cl.
*G06F 21/00* (2013.01)

(52) U.S. Cl.
USPC .............................................. 713/189; 726/27

(58) Field of Classification Search
CPC ....... G06F 21/60; G06F 21/602; G06F 21/62; G06F 21/6218
USPC ......... 726/34, 26, 27; 713/189, 192, 193, 194
See application file for complete search history.

(56) References Cited

U.S. PATENT DOCUMENTS

| | | | |
|---|---|---|---|
| 4,673,797 A | 6/1987 | Weirick | |
| 5,117,457 A | 5/1992 | Comerford et al. | |
| 5,410,598 A | 4/1995 | Shear | |
| 5,515,540 A | 5/1996 | Grider et al. | |
| 5,790,670 A | 8/1998 | Bramlett | |
| 5,861,662 A | 1/1999 | Candelore | |
| 5,998,858 A | 12/1999 | Little et al. | |
| 6,272,637 B1 | 8/2001 | Little et al. | |
| 6,275,151 B1 | 8/2001 | Gehlot | |
| 6,721,784 B1 | 4/2004 | Leonard et al. | |
| 6,853,093 B2 | 2/2005 | Cohen et al. | |
| 6,895,509 B1 | 5/2005 | Clark | |
| 7,005,733 B2 | 2/2006 | Kommerling et al. | |
| 7,048,195 B2 | 5/2006 | Berstis | |
| 7,099,110 B2 | 8/2006 | Detzler | |
| 7,668,954 B1 | 2/2010 | Melvin | |
| 7,717,326 B2 | 5/2010 | Kumhyr et al. | |
| 2004/0041723 A1 | 3/2004 | Shibamiya et al. | |
| 2005/0005156 A1 | 1/2005 | Harper | |
| 2006/0218412 A1* | 9/2006 | Hars et al. ...................... | 713/193 |
| 2006/0242431 A1 | 10/2006 | LeCrone et al. | |
| 2008/0010218 A1 | 1/2008 | Zank | |
| 2008/0263363 A1 | 10/2008 | Jueneman | |
| 2009/0037631 A1 | 2/2009 | Owens et al. | |
| 2011/0167004 A1 | 7/2011 | Zank | |

OTHER PUBLICATIONS

Gutmann P., "Secure Deletion of Data from Magnetic and Solid-State Memory," Proceedings of the Sixth Usenix Security Symposium, pp. 77-90, Usenix Association, 1996.

(Continued)

*Primary Examiner* — Edward Zee
(74) *Attorney, Agent, or Firm* — Stephen W. Melvin (57) ABSTRACT

A method and apparatus are utilized to incrementally encrypt stored information, and can be applied to an existing medium storing unencrypted information. Information can be conditionally encrypted and/or decrypted as necessary and a separate storage area can be used to record whether a given block of information is stored encrypted or unencrypted. An embodiment of the present invention can be used as a retrofit device in a mechanism to encrypt information without causing undue interruption of normal operations. A variety of mechanisms and policies can also be used to manage, set and eliminate encryption keys.

15 Claims, 10 Drawing Sheets

(56) References Cited

OTHER PUBLICATIONS

Di Crescenzo, G., Ferguson, N., Impagliazzo, R., and Jakobsson, M., "How to Forget a Secret," Symposium on Theoretical Aspects in Computer Science (STACS 99), Lecture Notes in Computer Science, Springer-Verlag, Berlin, 1999, pp. 500-509.

Hughes, G., "Wise Drives," IEEE Spectrum, Aug. 2002, pp. 37-41.

Garfinkel, S. L., and Shelat, B., "Remembrance of Data Passed: A Study of Disk Sanitization Practices," IEEE Security & Privacy, Jan. / Feb. 2003, pp. 17-27.

Trusted Computing Group, TPM Main, Part 1 Design Principles, Specification Version 1.2, Level 2, Revision 103, Jul. 9, 2007.

Trusted Computing Group, TPM Main, Part 2 TPM Structures, Specification Version 1.2, Level 2, Revision 103, Jul. 9, 2007.

Trusted Computing Group, TPM Main, Part 3 Commands, Specification Version 1.2, Level 2, Revision 103, Jul. 9, 2007.

Hughes, G. F., Commins, D. M., and Coughlin, T., "Disposal of Disk and Tape Data by Secure Sanitization," IEEE Security & Privacy, Jul. / Aug. 2009, pp. 29-34.

Mayer-Schönberger, V., Delete: The Virtue of Forgetting in the Digital Age, pp. 168-194, Princeton University Press, 2009.

Trusted Computing Group, TCG Storage Architecture, Core Specification, Specification Version 2.00, Final Revision 1.00, Apr. 20, 2009.

Trusted Computing Group, TCG Storage, Security Subsystem Class: Opal, Specification Version 1.00, Revision 3.00, Feb. 4, 2010.

Trusted Computing Group, TCG Storage, Application Note: Encrypting Drives Compliant with Opal SSC, Specification Version 1.00, Final Revision 1.00, Feb. 19, 2010.

Wikipedia, "Encrypting File System," http://en.wikipedia.org/wiki/Encrypting_File_System, retrieved on Jun. 26, 2010.

Dallas Semiconductor, "DS5002FP Secure Microprocessor Chip Data Sheet", 2006.

\* cited by examiner

INCREMENTAL ENCRYPTION OF STORED INFORMATION

CROSS REFERENCE TO RELATED APPLICATIONS

This application is a continuation of U.S. patent application Ser. No. 12/758,499, filed on Apr. 12, 2010, now U.S. Pat. No. 8,275,996, issued on Sep. 25, 2012, incorporated herein by reference. This application is also related to the following two co-pending applications both filed on Apr. 12, 2010: U.S. patent application Ser. No. 12/758,475 entitled "Virtual Self-Destruction of Stored Information," and U.S. patent application Ser. No. 12/758,487 entitled "Time-Based Key Management For Encrypted Information.", both of which are incorporated herein by reference.

FIELD OF THE INVENTION

This invention relates to the field of information storage and retrieval, and more specifically to methods and apparatus for protecting the confidentiality of stored information.

BACKGROUND

Digitally stored information is pervasive and encompasses every facet of everyday life. Increasing amounts of personal, private, confidential or otherwise sensitive information is stored on portable devices. If such devices are lost or stolen, this information is potentially compromised. Approaches to protecting stored information can broadly be classified as physical and cryptographic.

Physical protection involves ensuring that the hardware containing the stored information is physically secure and does not fall into the hands of those who might abuse it. Physical protection is not always practical, especially in the case of portable devices which are subject to loss or theft. Cryptographic protection involves encrypting stored information using one or more secret keys and protecting the security of the keys. Cryptographic protection has been wide employed on storage devices. Many disk drive manufacturers today offer full disk encryption and operating system support for disk encryption has been available for some time. Cryptographic protection relies on a secure key management system. If the key or keys are compromised, protection of the information may be lost.

Prior approaches to data security have focused on physical and cryptographic protection. An independent but related concept is the issue of data deletion. In many cases it is desirable to delete previously stored information. This can be in the case that a storage device is being decommissioned or discarded and/or the data is no longer needed or wanted. Data deletion is also a form of protection in that deleted data is no longer accessible to anyone, including those not authorized to access it. Data deletion approaches can be broadly classified as physical destruction, data overwrite and cryptographic. In the case of physical destruction the hardware containing the information is physically destroyed, rendering access to it impossible. Physical destruction of storage devices is cumbersome and may be unreliable. In the case of data overwrite, new data is written over previously existing data. Data overwrite can be time consuming, especially if conservative approaches to data overwrite are employed, in which data is overwritten multiple times with different patterns. Cryptographic deletion involves encrypting information that is stored and deleting the keys used to store the information. A cryptographic approach to data deletion does not require any physical destruction and can be done quickly without any need to change the data that is stored on the storage device.

Unfortunately existing approaches to data encryption do not provide efficient and convenient methods for data migration, where an encryption system can be applied to an unencrypted data storage device and an encryption policy can be gradually applied. Improved systems and methods for incremental data encryption are needed.

SUMMARY

A method and apparatus are utilized to incrementally encrypt stored information, and can be applied to an existing medium storing unencrypted information. Information can be conditionally encrypted and/or decrypted as necessary and a separate storage area can be used to record whether a given block of information is stored encrypted or unencrypted. An embodiment of the present invention can be used as a retrofit device in a mechanism to encrypt information without causing undue interruption of normal operations. A variety of mechanisms and policies can also be used to manage, set and eliminate encryption keys.

DETAILED DESCRIPTION

Figure 1:
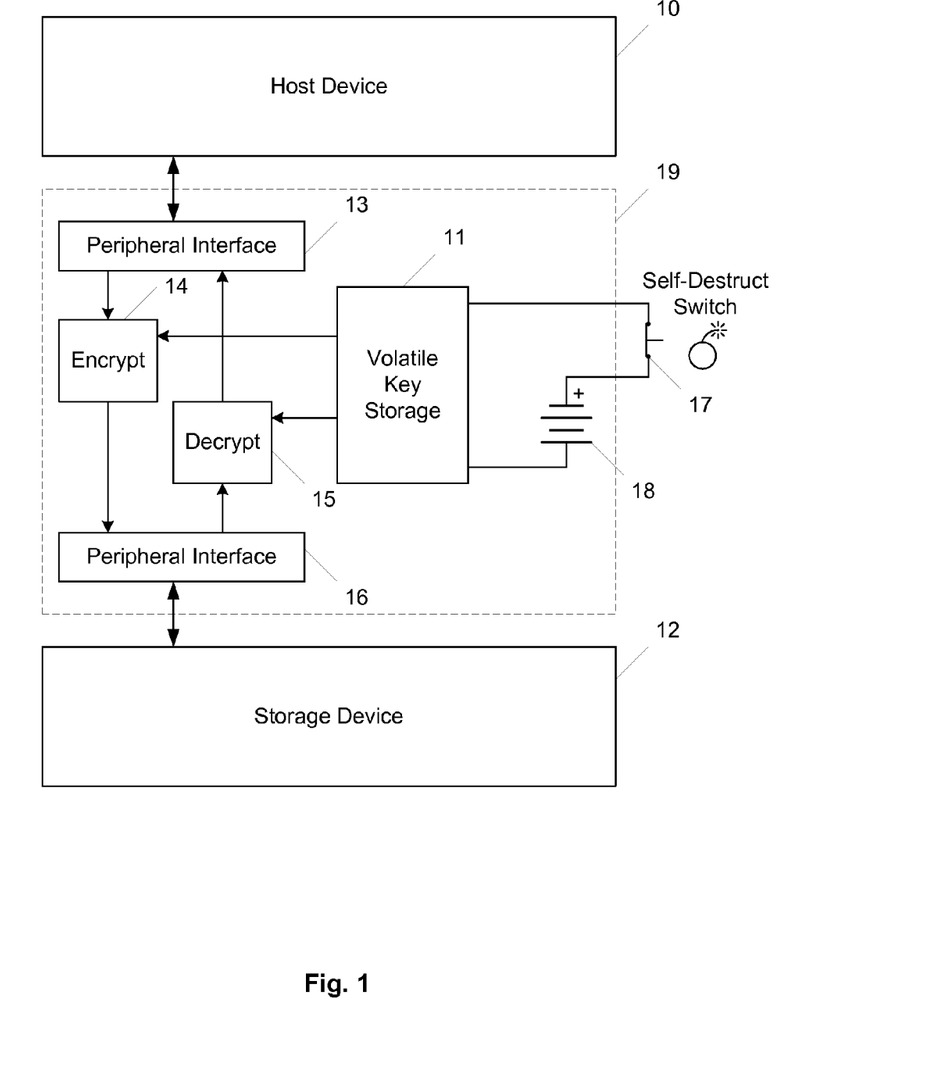
FIG. 1 illustrates an embodiment of a virtual self-destruct mechanism interposed between a host device and a storage device.

FIG. 1 illustrates an embodiment of a virtual self-destruct mechanism 19 interposed between host device 10 and storage device 12. Storage device 12 can be a conventional hard disk drive, a solid state drive or another form of digital storage. Peripheral interface 13 interfaces with host device 10 and peripheral interface 16 interfaces with storage device 12. Generally speaking, host device 10 is a producer and/or consumer of information and storage device 12 is a repository of information. Read and write commands are received by peripheral interface 13 and are communicated to peripheral interface 16. Responses to read and write commands are received by peripheral interface 16 and are communicated to peripheral interface 13.

In a preferred embodiment, read and write commands operate on blocks of data. In the case of conventional hard disk drives, many drives in current use today utilize 512 byte sectors as the smallest unit of information that can be read or written. Read and write commands received by peripheral interface 13 in this case would consist of operations on integer multiples of 512 bytes. Other block sizes are possible, for example some optical disk drives utilize 2048 byte sectors and there have also been proposals for larger sector sizes (e.g. 4096 bytes) in hard disk drives.

When peripheral interface 13 receives a write command from host device 10, the sector or sectors being written are encrypted by block 14 and a write command containing the encrypted sector or sectors will be passed to peripheral interface 16. The key or keys used to encrypt the sector or sectors are supplied by key storage 11. Storage device 12 will then receive a write command and will write the encrypted data to the specified sector or sectors.

In the case of a read command received by peripheral interface 13 from computer 10, the command will be passed along to storage device 12 through peripheral interface 16. When the data for the sector or sectors is returned to peripheral interface 16 from storage device 12, the data will be decrypted by block 15 and the decrypted data will be returned to host device 10 through peripheral interface 13. Key storage 11 will supply the key or keys to decrypt the data. Encryption block 14 and decryption block 15 are operated so as to guarantee that the encrypted data is returned to its original form.

In some embodiments, virtual self destruct mechanism 19 mirrors read and write commands across its peripheral interfaces 13 and 16 and implements identical interfaces between host device 10 and storage device 12. This allows virtual self destruct mechanism 19 to be retrofitted into existing computer systems without any changes to existing hardware or software. Host device 10 can communicate with virtual self destruct mechanism 19 in the same way as it would communicate directly with storage device 12. Similarly, storage device 12 can respond to commands from virtual self destruct mechanism 19 in the same way as it would respond to commands directly from host device 10.

The encryption mechanism employed by encryption block 14, decryption block 15 and key storage 11 can be a symmetric or non-symmetric system. In the case of a symmetric system, the same key is utilized for both encryption and decryption. In the case of a non-symmetric system different keys are utilized for encryption and decryption. Typically non-symmetric encryption systems involve generating encryption and decryption keys in matched pairs and are designed such that knowledge of one key does not permit a practical discovery of the other key. With a non-symmetric encryption mechanism it would be possible to have key storage 11 store only the decryption key or keys and move the encryption apparatus into the host device. In that case the host device could have the encryption key or keys and could encrypt the information before sending it to virtual self-destruct apparatus 19.

The encryption/decryption mechanism and the length of the key or keys used are chosen to safely protect the data such that an inspection of the encrypted data makes recovering the original data impractical. Higher levels of protection typically require more computation on the part of encryption block 14 and decryption block 15. The computational requirements of encryption block 14 and decryption block 15 can vary depending on the level of protection desired. In some embodiments, the data location, such as the sector number, can be used in the process of generating a key or keys for encryption and decryption. This guarantees that the same data will be encrypted differently if stored in different locations of the disk drive. In some embodiments virtual self-destruct apparatus includes hardware based on the Trusted Platform Module (TPM), which can be used to securely store keys and can be used to generate keys and key pairs using a built in random number generator.

In some embodiments, key storage 11 comprises volatile memory. This means that it contains storage elements that require power to maintain their contents. Examples of volatile storage devices are semiconductor RAM cells and semiconductor registers. Battery 18 is used to supply power to key storage 11, in the absence of power being supplied through peripheral interface 13 or peripheral interface 16 or some other source. If power is interrupted to volatile key storage 11 the key or keys will be erased. Self destruct switch 17 can be a momentary action mechanical push button switch which will temporarily interrupt power from being supplied from battery 18 to volatile key storage 11. In the case that self destruct switch 17 is activated when key storage is not receiving power from any other source, the keys used to encrypt information on storage device 12 will be lost. Thus, if the user simply presses self destruct switch 17, this causes the virtual destruction of stored information (kablooie!). The information stored on storage device 12 becomes unusable; while still accessible it is "virtually" destroyed because it is no longer practical to decrypt it. In other embodiments the keys are stored in non-volatile memory, but include circuitry that can automatically erase stored keys based on a signal from a user or application.

In some embodiments, other producers or consumers of information may replace host device 10 and the mechanism as described above can operate in substantially the same way. For example host device 10 could be replaced with a media player, cell phone, personal digital assistant (PDA), embedded controller, or the like. Similarly, other storage devices may replace storage device 12 and the mechanism as described above can operate in substantially the same way. For example storage device 12 could be replaced with flash memory, read/write memory (RAM), network attached storage (NAS), redundant storage devices (RAID), optical disk drives (CD-ROM or DVD), floppy disk drives, magnetic tape drives, or the like.

In some embodiments, a number of different keys are used to encrypt and decrypt information. For example, there could be a variety of different categories or groups of protected information, and they could each be encrypted with different keys. It may also be possible to selectively erase keys associated with certain categories of information and not to erase keys associated with other categories of information. In some embodiments certain information is not encrypted and therefore is not protected.

A number of different key management mechanisms are possible in conjunction with FIG. 1. In one embodiment, encryption and decryption keys are generated internally and not accessible to the outside world. In this case the elimination of the keys achieves complete inaccessibility. In other embodiments, it may be desirable for a trusted system to generate keys and for those keys to be subsequently installed. In this case, if the key is locally eliminated, the stored information can still be made accessible by going back to the original key generator. This may be a viable solution for portable devices since deletion of the decryption key will cause the information to be locally inaccessible, but may still be recovered using information stored in a central (and presumably more secure) location.

Figure 2A:
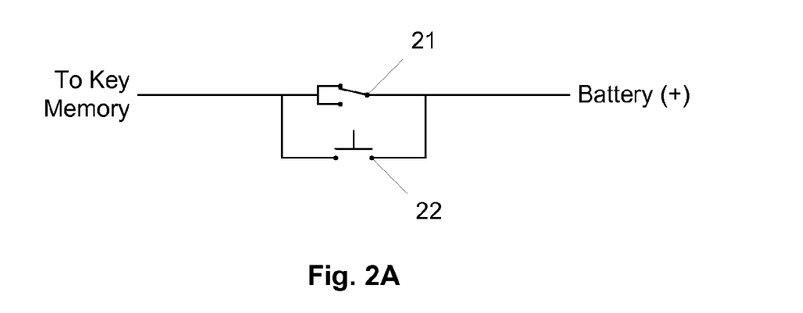
FIG. 2A illustrates a switch arrangement used in an embodiment of a virtual self-destruct mechanism.
Figure 2B:
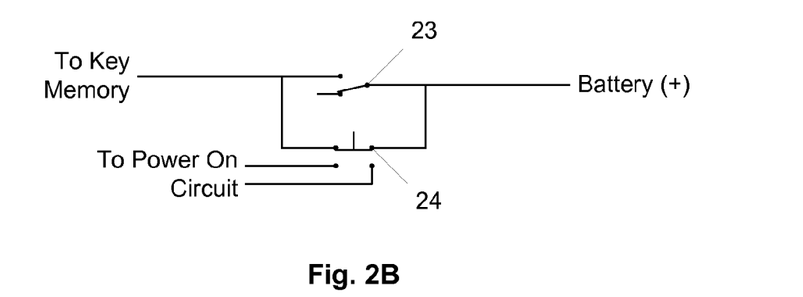
FIG. 2B illustrates a switch arrangement used in an embodiment of a virtual self-destruct mechanism.
Figure 2C:
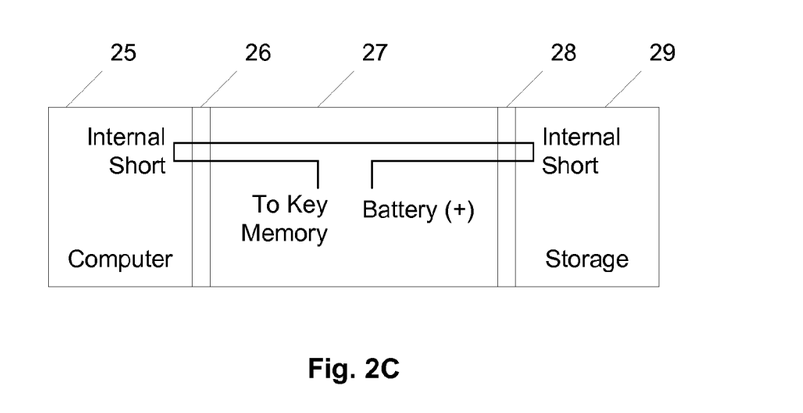
FIG. 2C illustrates a power connection arrangement used in an embodiment of a virtual self-destruct mechanism.
Figure 3A:
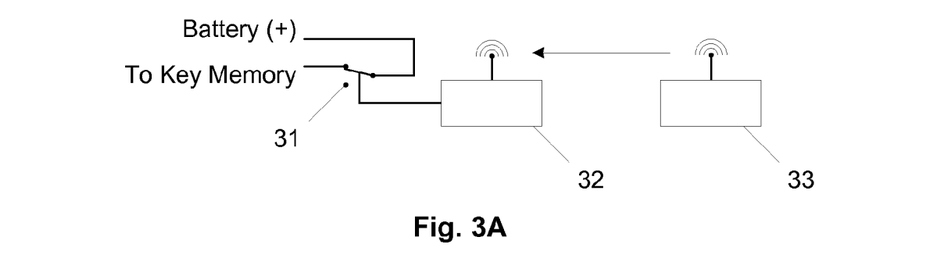
FIG. 3A illustrates a switch control mechanism used in an embodiment of a virtual self-destruct mechanism.
Figure 3B:
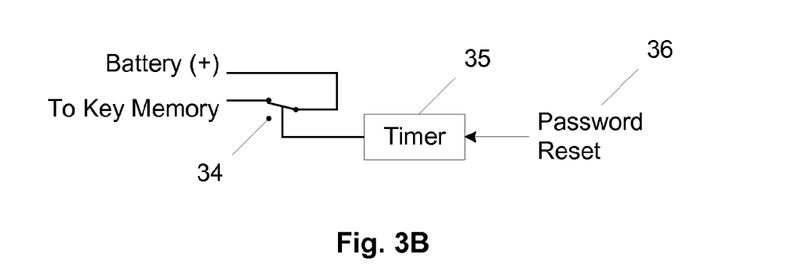
FIG. 3B illustrates a switch control mechanism used in an embodiment of a virtual self-destruct mechanism.
Figure 3C:
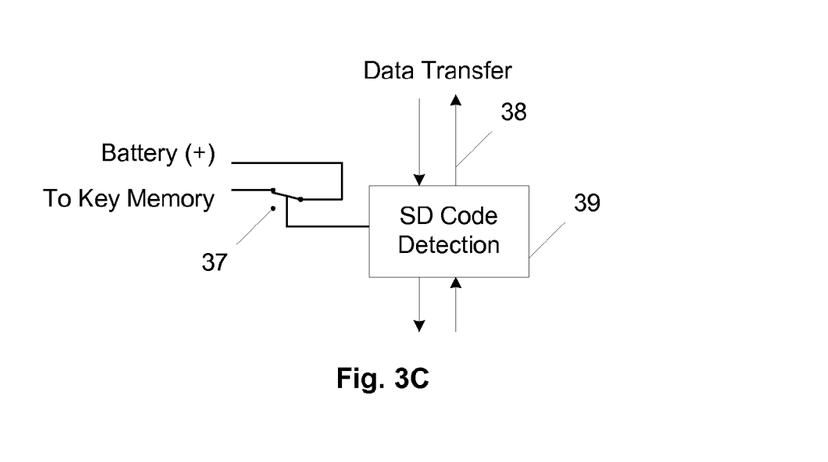
FIG. 3C illustrates a switch control mechanism used in an embodiment of a virtual self-destruct mechanism.

A number of different key elimination mechanisms are possible in conjunction with the embodiment described above. As discussed above, if the keys are stored in volatile memory, then by simply interrupting power to the volatile memory, information inaccessibility is achieved. FIGS. 2 and 3 illustrate a variety of mechanisms for interrupting power to voltage key storage 11 which can be used to implement key elimination. In alternative embodiments, these switching arrangements could be used to signal that keys should be erased, even if those keys are not stored in volatile memory. Some advantages of using volatile memory and interruption of power is that this mechanism:

1. does not require the host device or the storage device to be operating;
2. does not require the execution of any instructions by any embedded processor;
3. stores keys separate from the storage device itself;
4. does not rely on a proprietary and hidden mechanism for accessing keys.

FIG. 2A illustrates a simple protected switch arrangement. Switch 21 is a non-shorting switch that gets toggled when some part of the computer is prepared for operation. For example switch 21 could be a laptop cover switch that moves from the upper position to the lower position when the cover of a laptop computer is opened. Because switch 21 is non-shorting, power between the battery and the key memory will be interrupted when it changes position, unless switch 22 is pressed during that time. Switch 22 is preferably a hidden switch, a "safe open" switch, which is not apparent to an unauthorized user of the computer. Thus, in the case of the laptop cover switch, unless switch 22 is pressed during the time that the cover is being opened, the keys will be erased and information on a storage device will be rendered inaccessible. A non-authorized user of a device will open the cover without pressing switch 22, thereby protecting the stored information.

FIG. 2B illustrates another protected switch arrangement that can be used to protect stored information from unauthorized access. Power switch 24 is used to start up a device. For example, power switch 24 may be a laptop button used to power up a laptop. Switch 23 is a hidden switch, a "safe power-on" switch, which must be placed in the upper position before the device can be safely powered on. If switch 23 is left the lower position, an unsuspecting and unauthorized user of the device may attempt to access the device by powering it up by pressing switch 24. Doing so will cause stored keys to be erased, thereby rendering stored information inaccessible and protecting it from unauthorized access.

FIG. 2C illustrates a tamper resistant arrangement that can be used to prevent disassembly and inspection of a virtual self-destruct mechanism. Computer 25 is coupled through connector 26 to virtual self-destruct mechanism 27. Storage device 29 is coupled through connector 28 to virtual self-destruct mechanism 27. Because the power between the battery and the voltage key storage goes through connectors 26 and 28 and is internally shorted in computer 26 and storage device 29, any attempt to disassembly the assembly will cause power to be interrupted and will result in keys being erased. This will ensure that an attempt to tamper with virtual self-destruct mechanism 27, such as an attempt to retrieve stored keys, will result in the keys being erased and the stored information being made inaccessible and therefore protected. Other forms of tamper resistance are possible to prevent access to stored keys without interrupting power to a volatile storage element that stores those keys.

FIG. 3A illustrates another key elimination mechanism. Receiver 32 controls switch 31. Transmitter 33 is used to wirelessly transmit a signal to receiver 32. In one embodiment if receiver 32 fails to receive a signal from transmitter 33, switch 31 will be changed to the lower position, interrupting power to the key memory. The arrangement in FIG. 3A could be used for example by incorporating receiver 32 and switch 31 into a laptop computer and having transmitter 33 in a small hand-held device, such as a key chain. If the distance between the key chain and the laptop exceeds the distance necessary to transmit, which could be for example a few meters, the keys will be erased, thereby guaranteeing that the information is protected. This is a sort of "virtual hand-cuff" that would guarantee that if for example the laptop is stolen or physically separated from its owner for any reason, information stored on it will not be available.

FIG. 3B illustrates another information protection mechanism. Timer 35 controls switch 34. A reset signal 36 based on a password is used to reset timer 35. Timer 35 operates similar to a "watchdog" timer sometimes used in embedded systems. Unless timer 35 is reset within some period of time, it will cause switch 34 to be changed to the lower position, interrupting power to the key memory. The period of time allowed could be designed to allow, for example, a few seconds or a few minutes after a computer is powered up. The reset signal could be a password that only an authorized user of the computer knows and must enter within some period of time. Timer 35 can be designed to require a reset every time the device is powered, or periodically, or based on some other criteria. In one embodiment, a laptop is powered up and a message is displayed such as: "This laptop will self destruct in five seconds unless the proper password is entered." Failure to supply the correct password will cause the keys to be erased, thereby rendering stored information inaccessible, and therefore protected. In some embodiments, timer 35 may contain the correct password in an internal memory inaccessible to the outside, which would prevent an inspection of the hardware or software from revealing the correct password.

FIG. 3C illustrates another protection mechanism in which unauthorized use of a computer can cause stored information to be protected. SD Code Detection mechanism 39 examines information being transferred, for example between a computer and a storage device. A specific pattern, if read from or written to the storage device, can cause switch 37 to be activated, interrupting power to the key memory and thereby protecting stored information. Such a special self destruct pattern could be actively used by writing the pattern to the storage device. This could be accomplished by an application program that has determined that access is unauthorized and information needs to be protected. The self destruct pattern could also be passive in that it may be already stored in a special file or in an unused or hidden sector. In this case the special file acts as a sort of "decoy" which the authorized user knows should never be opened. The file could have an inviting name, such as "read_me.txt" or "Confidential_Business_Plans.doc". An attempt to read the information (which would only be done by an unauthorized user), would trigger SD Code Detection circuit 39 and cause keys to be erased and would render the contents of the storage device inaccessible.

Note that all of the mechanisms illustrated in FIGS. 2 and 3 could be used to selectively erase certain keys. It may be desirable to have different categories of information that are protected with different keys. Different mechanisms or multiple mechanisms could be used to protect different categories. It is also possible to combine the mechanisms illustrated in FIGS. 2 and 3 in a single device.

Figure 4A:
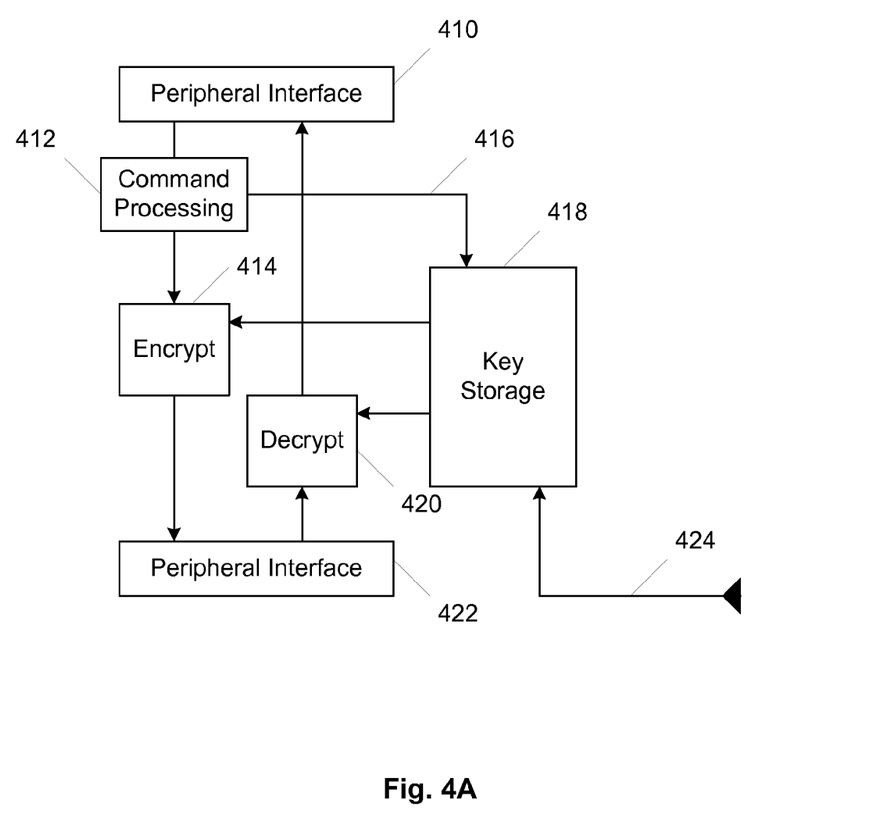
FIG. 4A illustrates a portion of a key management apparatus in a system employing encrypted information.

FIG. 4A illustrates how dynamic key management can be employed in a system using encryption of stored information. Dynamic key management refers to the ability to perform operations on stored keys while the system is in operation. In one embodiment peripheral interface 410 interfaces with a host system and peripheral interface 422 interfaces with a storage device. Encryption apparatus 414 encrypts information being transferred from the host to the storage device and decryption device 420 decrypts information being transferred from the storage device to the host. Key storage device 418 stores the one or more keys used to encrypt and decrypt information.

Command processing apparatus 412 is used to allow dynamic key management through applications running on a host system, such as one coupled to peripheral interface 410. In one embodiment, peripheral commands are examined by command processing apparatus 412 and those related to key management are intercepted and processed. Key management operations include key creation, key storage, key retrieval and key deletion. Key management operations can also be accomplished using external port 424. In some embodiments, external port 424 is a USB port and allows an external host system to perform key operations. In this way, key management can be controlled internally (using the main information data path) and/or externally (using an external port).

The dynamic key management apparatus illustrated in FIG. 4A could be combined with the virtual self-destruct mechanism illustrated in FIG. 1. Thus key deletion can be accomplished through the virtual self-destruct mechanisms discussed above or can be performed through the internal or external data path. In the case of applications that utilized command processing apparatus 412, these applications can be firmware running on the host device, BIOS software, OS drivers, OS daemons, user applications or some combination of the above. In some embodiments the operations on key storage 418 can be effected in a way that is transparent to the storage device using regular disk drive read and write commands with special data patterns. In other embodiments new or reserved commands can be utilized to communicate between host device and command processing apparatus 412.

Figure 4B:
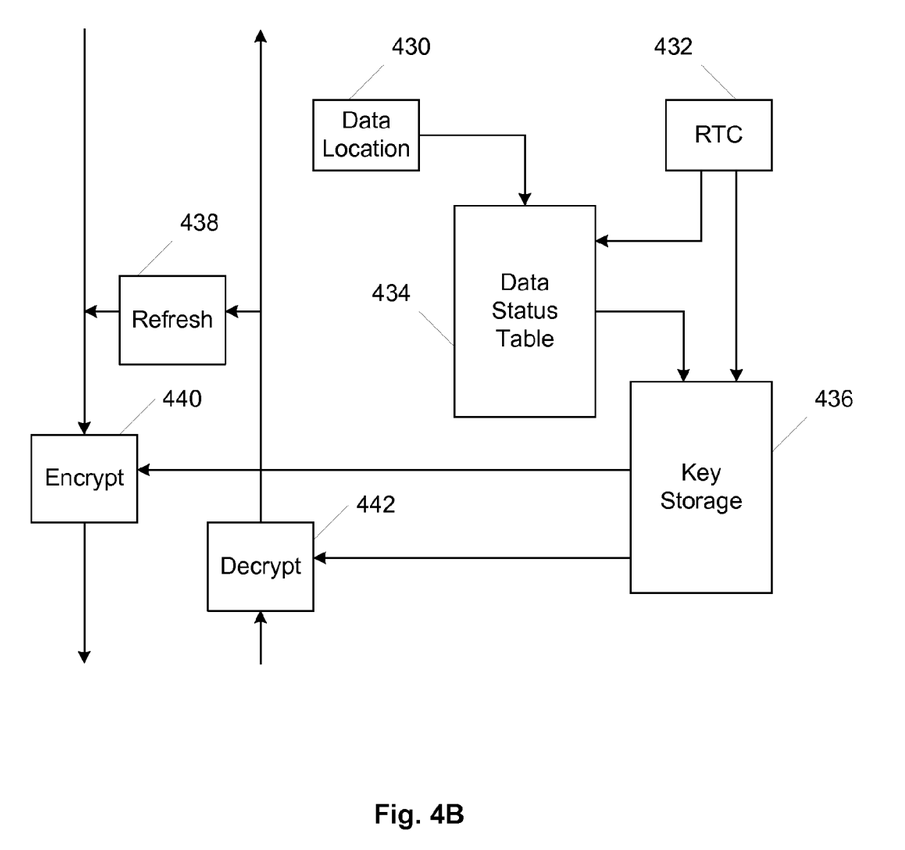
FIG. 4B illustrates a portion of a time-based key management apparatus in a system employing encrypted information.

FIG. 4B illustrates aspects of a time-based key management system. In some embodiments, a time-based key management system periodically creates new keys and deletes old keys based on a schedule. For example, a time based key management system could create a new key and delete the oldest key once per day. Such a system allows information older than a predetermined number of days to be virtually deleted. For example, if 730 keys are stored, one per day, then information that was encrypted using a key more than two years old will be automatically forgotten. This could be thought of as a "forgetful disk drive."

Encryption apparatus 440 encrypts information being transferred from a host device to a storage device and decryption apparatus 442 decrypts information being transferred from a storage device to a host device. Data status table 434 records for each block of data on the storage device the identification of a key used to encrypt the stored information. The block of data could be a sector number or could be some larger group of data, such as a file system cluster. The data location, such as the sector number, is stored in data location element 430 and is used to index into data status table 434. In one example 730 keys are stored in key storage 436 and data status table 434 stores a 10-bit index indicating which of the 730 keys should be used to decrypt the information currently stored at the location in question. Real time clock apparatus 432 is used to keep track of the current date and time, and to allow the periodic creation of new keys and erasure of old keys. For example, every day at 12:00 AM a new key could be created and data written to key storage 436. The oldest key would also be erased, for example the key associated with the same date two years previous. In the case of data being written to the storage device, data status table 434 is able to retrieve the current key of the day and update the entry for a specific data location.

In some embodiments, it may be desirable to automatically refresh data when it is being read from the storage device. In this case, it is necessary to decrypt and then re-encrypt the information using a different key. In this case, data from data decryption apparatus 442 is passed through refresh path 438 to encryption apparatus 440 and re-written to the same location. It may be desirable to use the current key of the day when a refresh operation is performed. This system would mean that data that had not been read within two years would be inaccessible. Other refresh policies are possible. For example, it would be possible to split the difference between the date associated with the data being read and the current date. This policy increases the life of the data being read, but not to a full two years. Another example is to merely decrement the key index by a certain number of days each time it is accessed. If the information is accessed frequently, it will have a longer life than if it is accessed infrequently. Such a policy in some ways mimics human memory recall in which information recalled more frequently and information that is more recent has a better chance of being remembered accurately.

In other embodiments it may be desirable to expose the expiration date of the data to the operating system and allow the OS to choose the expiration date within the window of available time periods (e.g. a two year window). For example, the date of access or the date of modification of a file could be used as the appropriate date for encrypting data being read or written. In this way new data being written could use an older key rather than the current key of the day. This allows the OS to specify a specific expiration date of data being written to the disk drive. In some embodiments special codes in the data status table could be used to mark unencrypted data or expired data. It is also possible to have different refresh modes depending on the location of the data, depending on instructions from the host, or as a device specific preference.

Figure 4C:
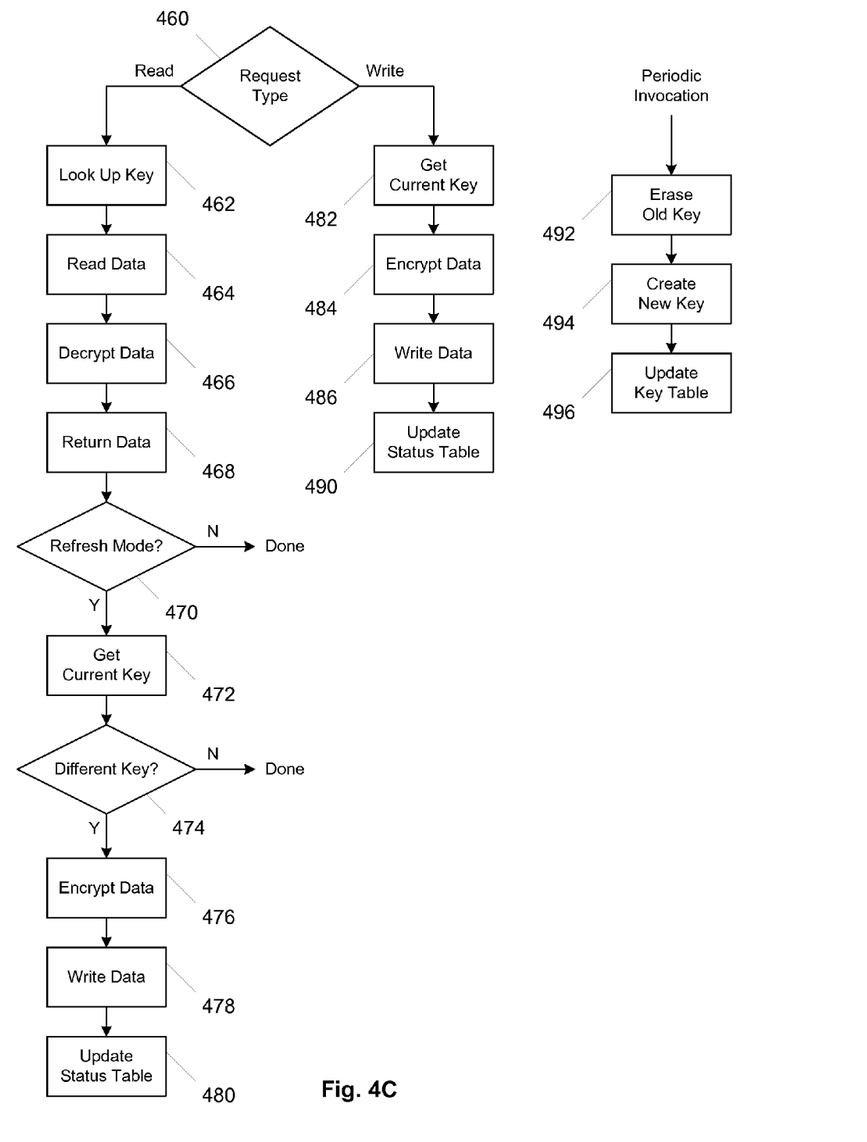
FIG. 4C illustrates steps in a method of time based key management in a system employing encrypted information.

FIG. 4C illustrates steps in a method of time based key management. In step 460, an incoming request, such as from a host device, is classified into a read request or a write request. In the case of a read request control is transferred to step 462 and in the case of a write request control is transferred to step 482. In step 462, the key associated with the data being read is retrieved. In some embodiments this involves using the sector number associated with the read request and using it to index into a data status table, such as that illustrated in FIG. 4B. The data status table may store the actual key or may then produce an index into a table of keys in a key storage table such as that illustrated in FIG. 4B. The resulting key is then made available to the encryption apparatus. In step 464 the data is read from the storage device and in step 466 the data is decrypted using the key retrieved in step 462. In step 468 the data that was read is returned to the host device.

As discussed above, in some embodiments, a "refresh" mode is utilized to change the key utilized to encrypt data when that data is read. In this case the data is decrypted and then re-encrypted using a different key. In step 470 refresh mode is determined. In the case of refresh mode for the data in question, control proceeds at step 472. In the case that refresh mode is not active for the data in question, the data transfer is concluded. In step 472 the "current" key is retrieved. In some embodiments a new encryption key is available each day so the current encryption key will be the key that is associated with the current date. This may come from a "real time clock" apparatus such as that described in connection with FIG. 4B. In step 474 a comparison is made between the key that was utilized to decrypt the data and the current key. In the case that the keys are the same, nothing more needs to be done. In the case that the keys are different control proceeds with step 476.

The current key is made available to the encryption apparatus and in step 476 the data that was decrypted is passed to the encryption apparatus and is encrypted using the new key. In step 478 the newly encrypted data is written to the storage device. In step 480 the sector table is updated to indicate the key that was utilized to encrypt the data. In this way a subsequent read of the same data will know which key to utilize.

In some embodiments caches are used within the interface or within the storage device. These caches, which store data being read from or written to the storage device can implement a write through or a write back policy. A cache could be employed to store data in its unencrypted state or its encrypted state or both. In the case of a write-through cache the actual write of modified data to the storage device is deferred. It may also be desirable to defer the re-encryption of steps 476 until such time as it is necessary to flush the modified data to the storage device.

In the case of write to the storage device, step 482 is used to retrieve the current key. Steps 482, 484, 486 and 490 are similar to steps 472, 476, 478 and 480 discussed above. The data being written is encrypted and then written to the storage device. The data status table is updated to reflect the key utilized for encryption. The use of the current key for data being written to the storage device means that the data is encrypted using the key associated with the current date. In the case that keys are deleted after two years, this mean that the data, unless it is read and refreshed, can be automatically deleted in two years by deleting the key associated with the current date.

FIG. 4C illustrates a series of steps invoked periodically, starting with step 492. In some embodiments this step will be invoked once per day, for example at 12:00 AM as an interrupt generated by a real time clock apparatus, such as that illustrated in FIG. 4B. In step 492 an old key is erased. By deleting the key associated with a certain time period, all data that was encrypted associated with that time period will be virtually deleted. In step 494 a new key is generated. This can be done according to known methods in a variety of different ways. In some embodiments a hardware random number generator is used to generate a new key in a secure environment. In step 496 the key table is updated to reflect a new "current" key, which can be used to encrypt newly written and refreshed data.

Figure 5:
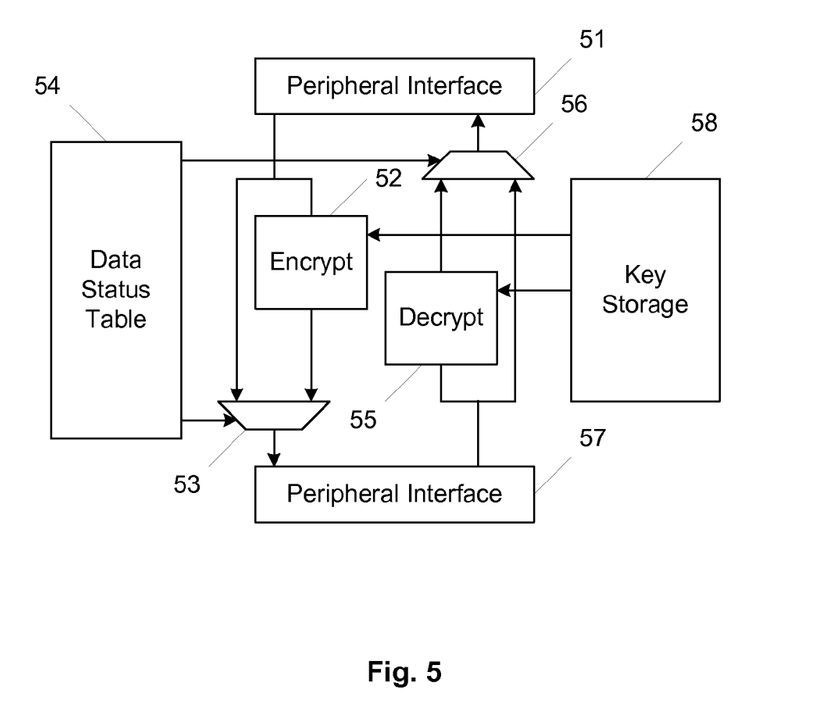
FIG. 5 illustrates an embodiment of an incremental encryption mechanism.

FIG. 5 illustrates a portion of an apparatus used in an incremental encryption embodiment employing storage of encrypted information. Incremental encryption can be used to allow an encryption apparatus to be attached to a storage device that is initially completely un-encrypted and allow it to gradually encrypt the data according to certain rules. This allows a retrofit to an existing data storage system and migration to an encrypted system without causing disruption of ongoing operations. Peripheral interface 51 interfaces with a device producing and consuming data, such as a host device, and peripheral interface 57 interfaces with a storage device, such as a disk drive. Data transferred from host interface 51 for storage may be encrypted by encryption apparatus 52, or it may pass unencrypted to multiplexer 53 to peripheral interface 57. Data being retrieved from the storage device across peripheral interface 57 may be decrypted by decryption apparatus 55 or may pass un-decrypted to multiplexer 56 to peripheral interface 51.

The determination of whether data is to be encrypted during storage and whether data is to be decrypted during retrieval is determined by data status table 54. In some embodiments data status table 54 contains an entry for each sector on the storage device and the sector associated with the data transfer in question will index into data status table 54. The keys used to encrypt and decrypt data are provided to encryption apparatus 52 and decryption apparatus 55 by key storage 58. Data status table 54 may alternatively store information based on some other block size, such as a file system cluster. In some embodiments the full contents of a data status table for the entire storage device are stored on the storage device itself, for example in reserved sectors, and data status table 54 represents a local cache of the most recently used data locations. Key storage 58 may contain more than one set of keys. The choice of which set of keys to use could be driven by the data location or could be controlled directly by the host device.

Figure 6:
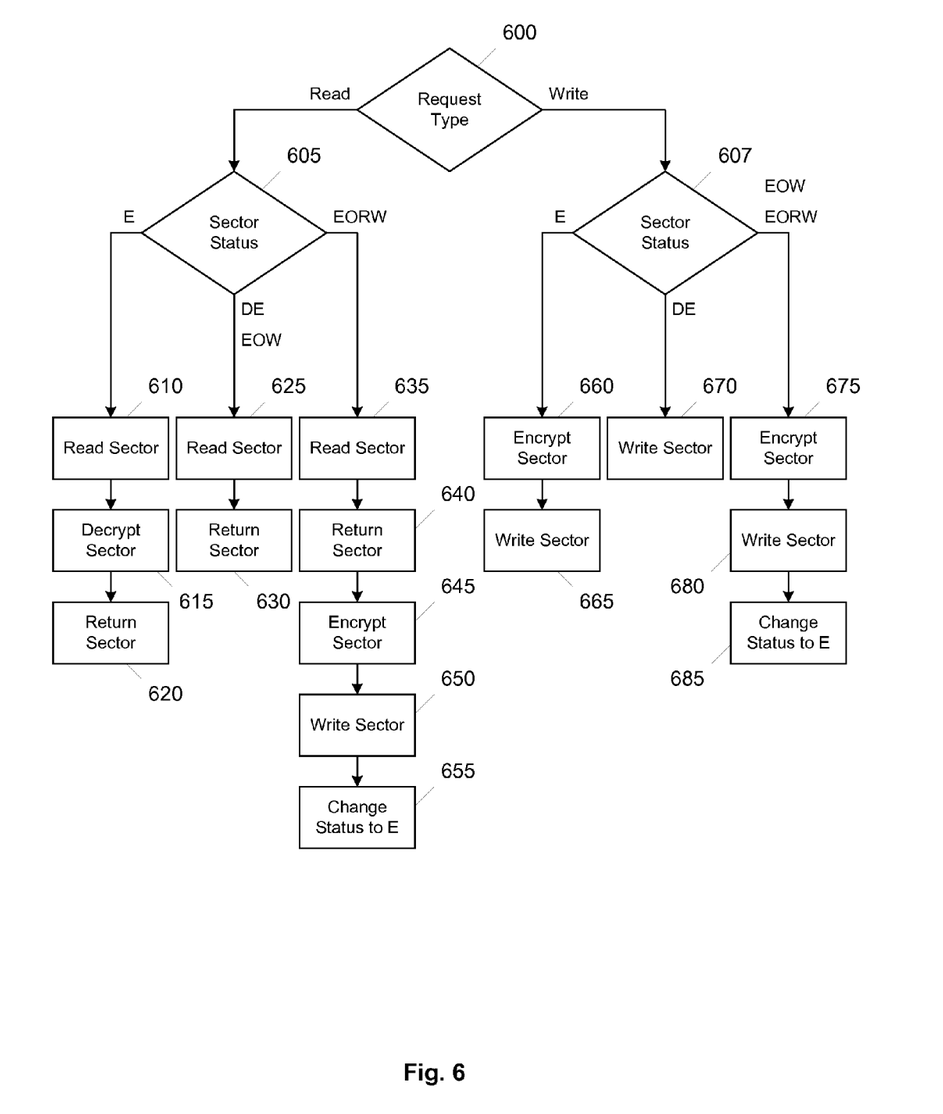
FIG. 6 illustrates steps in an embodiment of a sector based incremental encryption mechanism.

FIG. 6 illustrates steps in a method for incremental encryption of data on a storage device. In step 600 a determination is made whether an incoming request is a read operation or a write operation. In the case of a read operation control is passed to step 605 and in the case of a write operation control is passed to step 607. In the example illustrated in FIG. 6, sectors have a status associated with them in one of four states as shown below:

E: Encrypted
EORW: Unencrypted—Encrypt on Read or Write
EOW: Unencrypted—Encrypt on Write
DE: Unencrypted—Don't Encrypt In step 605, the status for the data being read is determined. This may involve indexing into a sector status table such as that discussed above and illustrated in FIG. 5. In the case that the data is in the E state, control is passed to step 610; in the case that the data is in the DE or EOW states, control is passed to step 625; and in the case that the data is in the EORW state control is passed to step 635. In step 610 the sector is read, in step 615 the sector is decrypted and in step 620 the data is returned to the host device. In step 625 the sector is read and in step 630 the sector is returned to the host device. The steps 625 and 630 represent a case that the sector is not encrypted so no decryption step is necessary.

In step 635 the sector is read and in step 640 the data is returned to the host device. Like steps 625 and 630, steps 635 and 640 represent a case when the sector is not encrypted so no decryption step is necessary. However, step 640 is followed by step 645 in which the data that was returned is encrypted and then in step 650 the encrypted data is written back to the storage device. In step 655 the data status table is updated to reflect the sector is in the 'E' or encrypted state.

Step 607 is used when a write command is received from the host device. Like step 605, a determination is made of which state the sector associated with the write is in. In the case of the E state, control is passed to step 660; in the case of the DE state, control is passed to step 670; and in the case of the EOW or EORW state, control is passed to step 675. In step 660 the data being written is encrypted and in step 665 the encrypted data is written to the storage device. In step 670 the data is written unencrypted to the storage device. In step 675 the data is encrypted and in step 680 the encrypted data is written to the storage device. Control proceeds with step 685 in which the data status table is updated to reflect that the data is in the 'E' or encrypted state.

FIG. 6 has been illustrated in connection with a single E state. In alternative embodiments there could be multiple encrypted states identified in the sector status table. These multiple states could identify the key used in connection with the sector in question. The time-based key management system discussed above could be combined with this mechanism in this way with the encrypted state identifying the time period of encryption. In some embodiments the sector status table is initialized such that all sectors are labeled as unencrypted and the apparatus is coupled to a storage device already containing information but not yet encrypted. For example, the sector status table to could be initialized to all EORW and DE states. In some cases it would be desirable for a background application to sweep through all sectors on the storage device so that over time all sectors would be encrypted.

Figure 7:
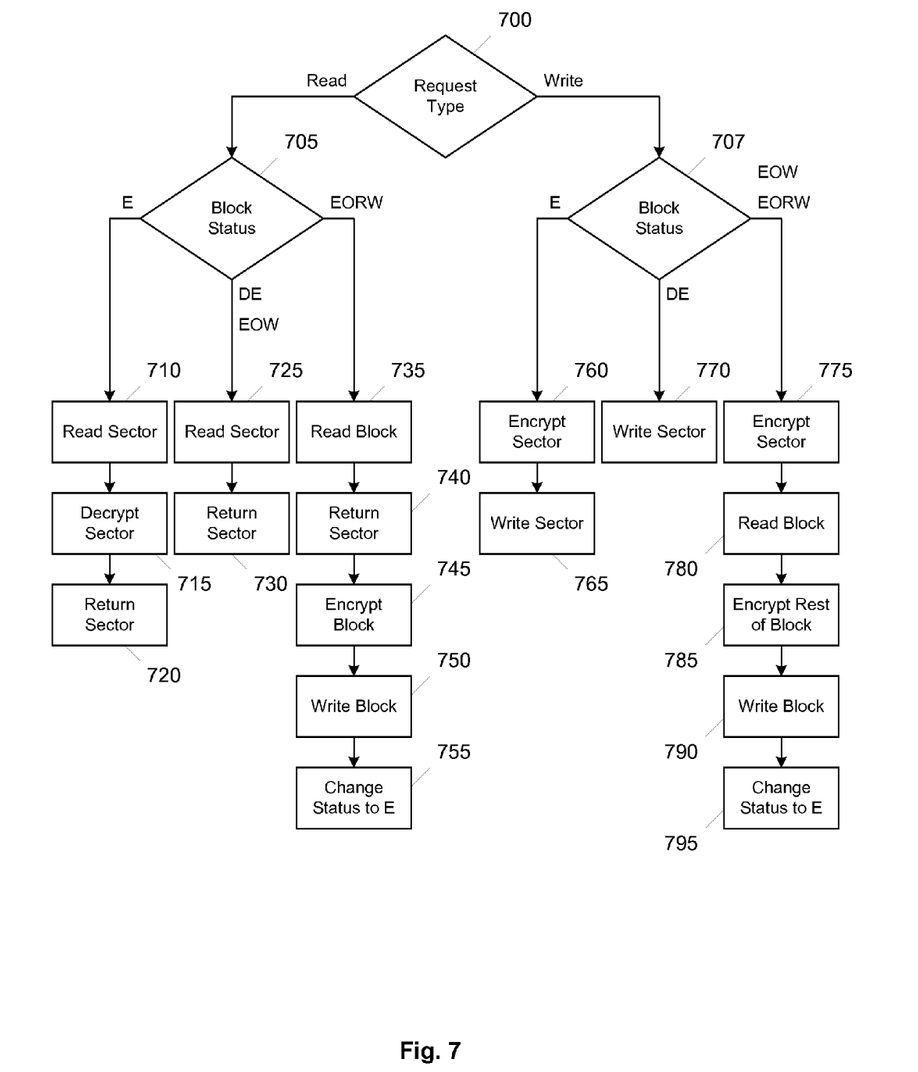
FIG. 7 illustrates steps in an embodiment of a block based incremental encryption mechanism.

FIG. 7 illustrates an alternative embodiment of an incremental encryption method. The embodiment illustrated in FIG. 7 is similar to the embodiment discussed above and illustrated in FIG. 6 except that the data status is based on blocks of data rather than sectors. In general, FIG. 6 relates to embodiments in which the units of data associated with commands from the host device are individually tagged by a data status table while FIG. 7 relates to embodiments in which larger units of data are tagged by a data status table. This may be advantageous to reduce the size of the data status table and if a lower level of granularity is not needed. The blocks referred to in FIG. 7 may be "clusters" such as implemented by a file system at the operating system level or the blocks may be any other grouping of data larger than the atomic unit of data processed by commands from the host.

In step 700 a determination is made whether an incoming request is a read operation or a write operation. In the case of a read operation control is passed to step 705 and in the case of a write operation control is passed to step 707. As discussed above in connection with FIG. 6, data regions, in this case clusters rather than sectors, have a status associated with them in one of four states: E, EORW, EOW and DE.

In step 705, the status for the data being read is determined. This may involve indexing into a cluster status table such as that discussed above and illustrated in FIG. 5. In the case that the data is in the E state, control is passed to step 710; in the case that the data is in the DE or EOW states, control is passed to step 725; and in the case that the data is in the EORW state control is passed to step 735. Steps 710, 715, 720, 725 and 730 operate similarly to analogous steps 610, 615, 620, 625 and 630 discussed above and illustrated in FIG. 6. In this case even though the data status table stores information associated with clusters, the read operation is for an individual sector so only the requested sector is read and possibly decrypted.

In step 735 the entire cluster than contains the requested sector is read. This typically involves reading from the storage device more data that was actually requested by the host device. In step 740 the requested data is returned to the host device. Steps 735 and 740 may be optimized so that the requested data is read first and returned and the remaining data for the cluster is subsequently read. Steps 735 and 740 are followed by step 745 in which the cluster that was read is encrypted and then in step 750 the encrypted cluster is written back to the storage device. In step 755 the data status table is updated to reflect the sector is in the 'E' or encrypted state.

Step 707 is used when a write command is received from the host device. Like step 705, a determination is made of which state the cluster associated with the write is in. in the case of the E state, control is passed to step 760; in the case of the DE state, control is passed to step 770; and in the case of the EOW or EORW state, control is passed to step 775. Steps 760, 765 and 770 operate similarly to steps 660, 665 and 670 discussed above and illustrated in FIG. 6. Even though the data status table stores information on the basis of a cluster, an individual sector write is possible since the status of the cluster is not changing.

In step 775 the data being written is encrypted. In step 780 the entire cluster is read from the storage device and in step 785 the portions of the cluster that are not being written are encrypted. The result of step 775 and step 785 are combined into a resulting cluster which is written to the storage device in step 790. Control proceeds with step 795 in which the data status table is updated to reflect that the data is in the 'E' or encrypted state. As discussed above, it is possible to employ caches to store the unencrypted information, the encrypted information, or both. Such caches can be used to reduce the number of reads and writes necessary to pass to the storage device. It may also be possible to defer the encryption of a block in step 785 as this may reduce the amount of encryption needed. If a subsequent write to an adjacent sector in the same block is received then the original contents of that sector do not need to be encrypted.

Figure 8:
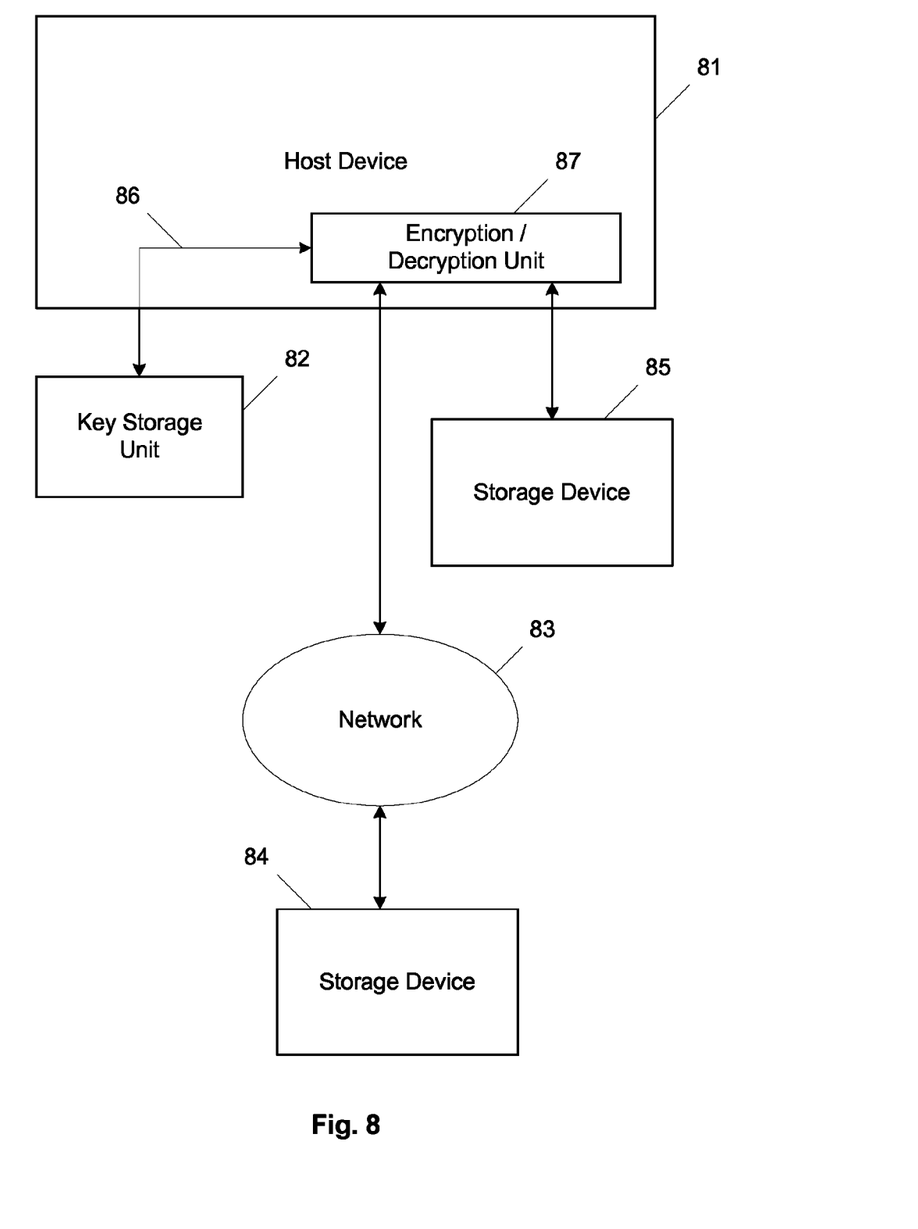
FIG. 8 illustrates decoupling of key storage and data storage in an embodiment employing encrypted information.

FIG. 8 illustrates portions of an apparatus in which key storage is decoupled from the storage device. Host device 81 can generate data for storage on a storage device and can request retrieval of stored data. Host device 81 can communicate with a locally connected storage device 85 and/or a storage device 84 coupled over a network 83. Host device 81 could be a general purpose computer such as a laptop computer or a personal device such as a PDA or could be a server. Encryption/decryption apparatus 87 is an apparatus that encrypts and encrypts data being stored and retrieved by host device 81. The encryption and decryption could be similar to the encryption and decryption apparatuses discussed above and illustrated in FIG. 1, 4A, 4B or 5. Key Storage Unit 82 stores the keys utilized by the Encryption/Decryption Unit 87. Communication path 86 is used to communicate the keys stored by Key Storage Unit 82. In some embodiments this communication path is a secure path that is secured either physically or cryptographically or both. For example, the keys being communicated on communication path 86 could themselves be encrypted according to a public key encryption mechanism so that observation of the data being communicated would not reveal the keys. In some embodiments Key Storage Unit 82 is a portable storage device such as could be embodied in a USB thumb drive.

Key Storage Unit 82 could be combined with a virtual self-destruct mechanism such as illustrated in FIG. 2A, 2B, 3A, 3B or 3C to allow deletion of the stored keys. This could be utilized when key storage unit 82 is in communication with host device 81 or when it is not. In some embodiments it is necessary for key storage unit 82 to be in constant communication with encryption/decryption unit 87 when data transfers are taking place. In other embodiments, host device 81 reads keys from key storage unit 82 and can hold them for a limited period of time.

The present invention has been described above in connection with several preferred embodiments. This has been done for purposes of illustration only, and variations of the inventions will be readily apparent to those skilled in the art and also fall within the scope of the invention.

The invention claimed is:

1. A method of processing read commands comprising the steps of:
providing a memory device storing a block status table containing a plurality of entries, wherein at least one of said entries is in one of a first state, a second state and a third state, wherein said first state is indicative that respective data is encrypted, said second state is indicative that respective data is not encrypted and should remain unencrypted, and said third state is indicative that respective data is not encrypted and should be encrypted when it is read;

receiving a read command from a host interface wherein said read command comprises a data location;

retrieving an entry in said block status table associated with said data location;

if said entry is in said first state, performing the sub-steps of:
  receiving data corresponding to said data location from a storage device interface;
  decrypting said data to generate decrypted data;
  providing said decrypted data to said host interface;

if said entry is in said second state, performing the sub-steps of:
  receiving data corresponding to said data location from said storage device interface;
  providing said data to said host interface;

if said entry is in said third state, performing the sub-steps of:
  receiving data corresponding to said data location from said storage device interface;
  providing said data to said host interface;
  encrypting said data to create encrypted data;
  providing said encrypted data to said storage device interface;
  updating said entry in said block status table from said third state to said first state.

2. The method according to claim 1 wherein said first state represents an Encrypted (E) state.

3. The method according to claim 1 wherein said second state represents an Unencrypted—Encrypt on Write (EOW) state.

4. The method according to claim 1 wherein said second state represents an Unencrypted—Don't Encrypt (DE) state.

5. The method according to claim 1 wherein said third state represents an Unencrypted—Encrypt on Read or Write (EORW) state.

6. The method according to claim 1 wherein said block status table stores information indexed by the sector number corresponding to a data location.

7. The method according to claim 1 wherein said block status table stores information indexed by the cluster number corresponding to a data location.

8. A method of processing write commands comprising the steps of:
  providing a memory device storing a block status table containing a plurality of entries, wherein at least one of said entries is in one of a first state, a second state and a third state, wherein said first state is indicative that respective data is encrypted and data being written should be encrypted before it is written, said second state is indicative that respective data is not encrypted and data being written should not be encrypted before it is written, and said third state is indicative that respective data is not encrypted and data being written should be encrypted before it is written;

receiving a write command from a host interface wherein said write command comprises write data and a data location;

retrieving an entry in said block status table associated with said data location;

if said entry is in said first state, performing the sub-steps of:
  encrypting said write data to create encrypted data;
  providing said encrypted data to a storage device interface;

if said entry is in said second state, performing the sub-steps of:
  providing said write data to said storage device interface;

if said entry is in said third state, performing the sub-steps of:
  encrypting said write data to create encrypted data;
  providing said encrypted data to said storage device interface;
  updating said entry from said third state to said first state.

9. The method according to claim 8 wherein if said entry is in said third state, further comprising performing the sub-steps of:
  receiving data corresponding to said data location from said storage device interface;
  encrypting said data received from said storage device interface to create encrypted block data;
  providing at least a portion of said encrypted block data to said storage device interface.

10. The method according to claim 8 wherein said first state represents an Encrypted (E) state.

11. The method according to claim 8 wherein said second state represents an Unencrypted—Don't Encrypt (DE) state.

12. The method according to claim 8 wherein said third state represents an Unencrypted—Encrypt on Write (EOW) state.

13. The method according to claim 8 wherein said third state represents an Unencrypted—Encrypt on Read or Write (EORW) state.

14. The method according to claim 8 wherein said block status table stores information indexed by the sector number corresponding to a data location.

15. The method according to claim 8 wherein said block status table stores information indexed by the cluster number corresponding to a data location.

* * * * *